United States Patent [19]

Harada et al.

[11] Patent Number: 4,517,647
[45] Date of Patent: May 14, 1985

[54] MEMORY SYSTEM OF WHEEL SPEED OF VEHICLE WITH SKID CONTROL SYSTEM

[75] Inventors: Atsumu Harada; Tetsuro Arikawa, both of Kanagawa, Japan

[73] Assignee: Nippon Air Brake Co., Ltd., Kobe, Japan

[21] Appl. No.: 367,628

[22] Filed: Apr. 12, 1982

[30] Foreign Application Priority Data

Apr. 16, 1981 [JP] Japan ................................ 56-57506

[51] Int. Cl.³ ............................................. B60T 8/08
[52] U.S. Cl. .................................... 364/426; 364/565; 303/108; 303/93; 303/95
[58] Field of Search ................ 364/426, 565; 303/108, 303/93, 95, 105

[56] References Cited

U.S. PATENT DOCUMENTS

Re. 31,383 9/1983 Leiber et al. ........................ 364/426
3,988,042 10/1976 Aoki et al. ............................ 303/108

Primary Examiner—Vit W. Miska
Assistant Examiner—Saul M. Bergmann
Attorney, Agent, or Firm—McDougall, Hersh & Scott

[57] ABSTRACT

A memory system of wheel speed of a vehicle with skid control system includes a wheel speed sensor associated with the wheel; a skid control unit measuring the skid condition of the wheel on the basis of the output signal of the wheel speed sensor and generating a control signal for controlling the brake fluid pressure to the brake of the wheel; a wheel speed signal generator connected to the wheel speed sensor for generating a wheel speed signal having analogue or digital value proportional to the rotational speed of the wheel; a memory device for memorizing the wheel speed signal from the wheel speed signal generator; a switch device arranged between the wheel speed signal generator and the memory device for controlling the transmission of the wheel speed signal to the memory device; and a brake operation signal generator for generating a brake operation signal when the vehicle is braked, the brake operation signal and the control signal of the skid control unit being supplied to the switch device; and the switch device allowing the wheel speed signal to be transmitted to the memory device when the brake operation signal or the control signal is generated from the brake operation signal generator or the skid control unit.

20 Claims, 3 Drawing Figures

MEMORY SYSTEM OF WHEEL SPEED OF VEHICLE WITH SKID CONTROL SYSTEM

BACKGROUND OF THE INVENTION

1. Field of the Invention

This invention relates to a memory system of wheel speed of a vehicle with skid control system, and more particularly to a memory system for memorizing accurately the wheel speed of the vehicle with skid control system even in an accident or an emergency in which the vehicle does not leave tire traces on the road, even when the vehicle is rapidly braked, due to skid control operation.

2. Description of the Prior Art

Hitherto, a tachograph is used as a recorder in which a vehicle speed or a wheel rotational speed is always recorded. It is suitable for rough check of change of wheel speed. However, it is unsuitable for the case that the change of wheel speed for a very short time in an emergency or an accident should be investigated, or that brake operation immediately before the emergency or accident should be investigated, since its resolving power is poor.

Generally, when a vehicle with skid control system is rapidly braked, the skid control system operates. Accordingly, such an apparatus was already proposed that an operation signal or control signal from the skid control system is recorded in order to know how the vehicle has been braked. However, when a vehicle runs on a road of high frictional coefficient, a large braking force can be imparted to the vehicle without skid. The skid control system does not operate, although a sufficient braking operation has been performed. In that case, it is unknown whether any braking operation has been performed, or not, from the recorder. There is the fear of misjudgement.

SUMMARY OF THE INVENTION

Accordingly, it is an object of this invention to provide a memory system of wheel speed of a vehicle with skid control system which overcomes the above defects of the conventional memory system of wheel speed of a vehicle.

Another object of the invention is to provide a memory system of wheel speed of a vehicle with skid control system which can accurately memorize the change of wheel speed of the vehicle during braking operation irrespective of whether the skid control system is operating or not, and can accurately memorize the change of wheel speed of the vehicle, also when the wheel or vehicle is rapidly decelerated without braking operation, for example, due to vehicle collision.

A further object of this invention is to provide a memory system of wheel speed of a vehicle with skid control system in which capacity of the memory device can be small.

A still further object of this invention is to provide a memory system of wheel speed of a vehicle with skid control system in which the memorized wheel speed signals can be read out in a short time.

A still further object of this invention is to provide a memory system of wheel speed of a vehicle with skid control system which is further provided with a read-out device.

In accordance with an aspect of this invention, a memory system of wheel speed of a vehicle with skid control system includes (A) A wheel speed sensor associated with the wheel; (B) a skid control unit measuring the skid condition of the wheel on the basis of the output signal of the wheel speed sensor and generating a control signal for controlling the brake fluid pressure to the brake of the wheel; (C) a wheel speed signal generator connected to the wheel speed sensor for generating a wheel speed signal having analogue or digital value proportional to the rotational speed of the wheel; (D) a memory device for memorizing the wheel speed signal from the wheel speed signal generator; (E) a switch device arranged between the wheel speed signal generator and the memory device for controlling the transmission of the wheel speed signal to the memory device; and (F) a brake operation signal generator for generating a brake operation signal when the vehicle is braked, the brake operation signal and the control signal of the skid control unit being supplied to the switch device; and the switch device allowing the wheel speed signal to be transmitted to the memory device when the brake operation signal or the control signal is generated from the brake operation signal generator or the skid control unit.

The foregoing and other objects, features, and advantages of the present invention will be more readily understood upon consideration of the following detailed description of the preferred embodiment of the invention, taken in conjunction with the accompanying drawings.

DETAILED DESCRIPTION OF THE PREFERRED EMBODIMENT

Next, a memory system of wheel speed of a vehicle with skid control system according to one embodiment of this invention will be described with reference to the drawings.

Figure 1:
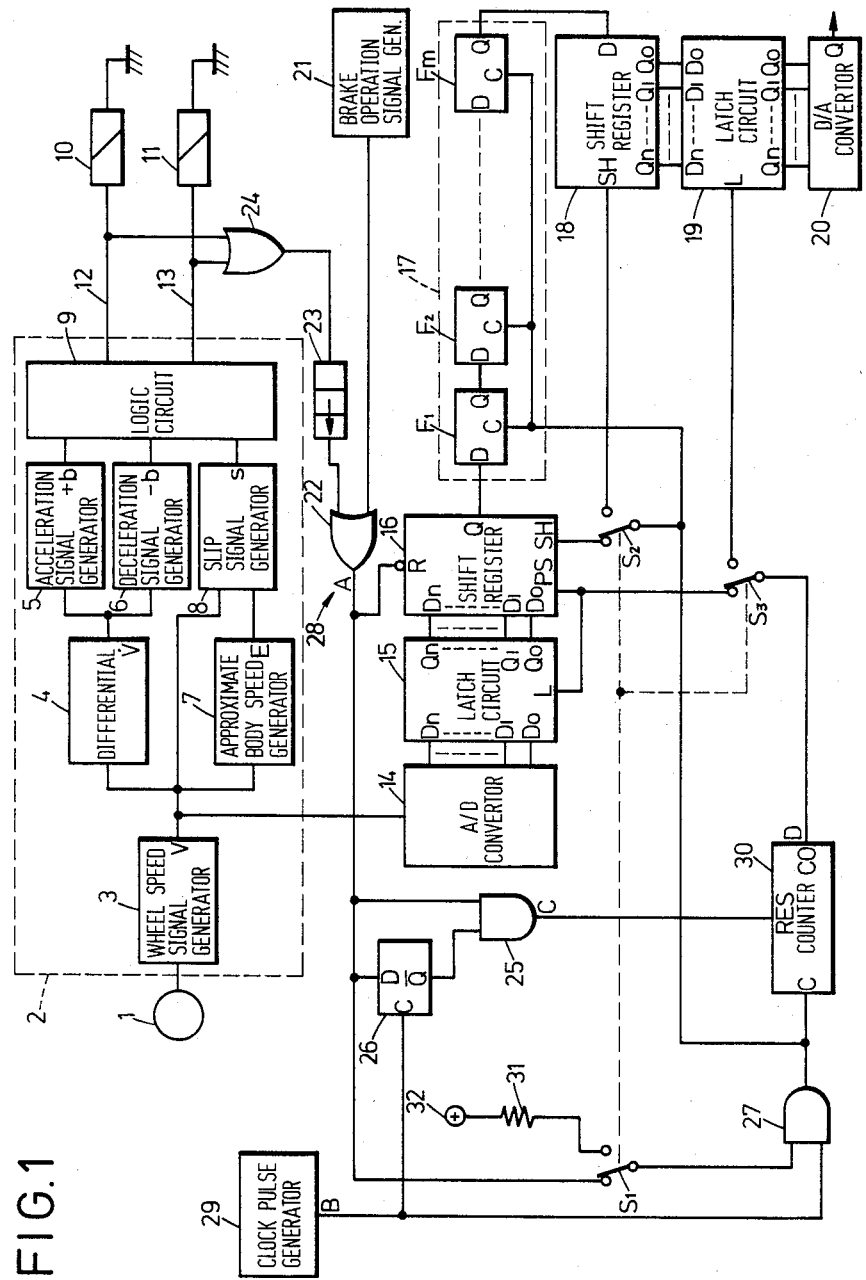
FIG. 1 is a block diagram of a memory system of wheel speed of a vehicle with skid control system according to one embodiment of this invention.

In FIG. 1, a wheel speed sensor 1 is associated with one wheel of the vehicle. Although not shown, other wheel speed sensors may be associated with the other wheels of the vehicle, and respectively connected to the similar block diagrams to the block diagram shown in FIG. 1. For example, the wheel speed sensor 1 is associated with one of the rear wheels of the vehicle. However, it may be associated with the drive shaft between the vehicle transmission and the differential gear so as to sense the average speed of the rear wheels of the vehicle.

The wheel speed sensor 1 generates a pulse signal having a frequency proportional to the rotational speed of the wheel, and it is connected to a skid control circuit arrangement or unit 2 enclosed by dashed lines in FIG. 1. The skid control circuit arrangement 2 has the conventional construction. The pulse signal of the wheel speed sensor 1 is supplied to a wheel speed signal generator 3 of the skid control arrangement 2 to be converted to a wheel speed signal V having analogue value proportional to the rotational speed of the wheel. In the skid control arrangement 2, the wheel speed signal V is supplied to an approximate body (vehicle) speed generator 7, a slip signal generator 8 and a differentiator 4. Since the actual speed of the vehicle cannot be conveniently measured directly, the vehicle speed is simulated by the approximate body speed generator 7. The approximate body speed signal E, when the decreasing rate of the wheel speed signal V is smaller than a predetermined rate, is equal to the wheel speed signal V. When the decreasing rate of the wheel speed signal V becomes larger than the predetermined rate, it decreases at a predetermined gradient. The simulated vehicle speed signal E from the approximate body speed generator 7 is supplied to the slip signal generator 8 to determine the slip of the wheel. Slip signal generator 8 may be comprised of a potentiometer and a comparator. In the slip signal generator 8, the simulated vehicle speed signal or approximate body speed signal E is compared with the wheel speed signal V. Generally, a slip $\lambda$ is given by the following formula:

$\lambda = 1 -$ wheel speed/vehicle speed

When (1-V/E) is larger than a predetermined threshold slip $\lambda$ (for example, 0.15), the slip signal generator 8 generates a slip signal S, namely the output of the slip signal generator 8 becomes a logical "1".

The wheel speed signal V of the wheel speed signal generator 3 is differentiated with respect to time in the differentiator 4. A signal V proportional to the acceleration or deceleration of the wheel is generated from the differentiator 4, and it is supplied to a deceleration signal generator 6 and an acceleration signal generator 5, which generators are preferably comparators. In the deceleration signal generator 6, the output signal V of the differentiator 4 is compared with a predetermined threshold deceleration which is, for example, equal or corresponds to $-1.5$ g. When the absolute value of the signal V is larger than the predetermined threshold deceleration, the deceleration signal generator 6 generates a deceleration signal $-b$, namely the output of the deceleration signal generator 6 becomes a logical "1". In the acceleration signal generator 5, the output signal V of the differentiator 4 is compared with a predetermined threshold acceleration which is, for example, equal or corresponds to 0.5 g. When the signal V is larger than the predetermined threshold acceleration, the acceleration signal generator 5 generates an acceleration signal $+b$, corresponding to a logical "high" or "1".

Output terminals of the acceleration signal generator 5, deceleration signal generator 6 and slip signal generator 8 are connected to a logic circuit 9. When the deceleration signal $-b$ or the slip signal S is generated, it is judged that skid has occurred in the wheel. Control signals are generated from the logic circuit 9, and supplied through lines 12 and 13 to solenoid portions 10 and 11 of inlet and outlet valves (not shown), respectively, to energize the latters. The fluid brake pressure to the brake for the wheel is decreased. With the decrease of the wheel speed, the acceleration signal $+b$ is generated. Then, the control signal is generated only on the line 12 and to energize only the solenoid portion 10 of the inlet valve. The fluid brake pressure to the brake for the wheel is maintained at constant. When the wheel speed increases almost to the vehicle speed, each of the signals $+b$, $-b$ and S becomes a logical "0", which, in turn, results in the output control signals from the logic circuit 9. Thus, the fluid brake pressure to the brake for the wheel is again increased.

The inlet and outlet valves are called also "cut-off valve" and "discharge valve", respectively and they have the well known structures. When both of the cut-off valve and discharge valve are deenergized, the cut-off valve is opened, and the discharge valve is closed, so that a master cylinder and the brake for the wheel are made to communicate with each other, to increase the fluid brake pressure to the brake for the wheel. When both of the cut-off valve and discharge valve are energized, the cut-off valve is closed, and the discharge valve is opened, so that the fluid brake pressure to the brake for the wheel is decreased. And when only the cut-off valve is energized, both of the valves are closed to maintain the fluid brake pressure to the brake for the wheel.

Next, a memory system for memorizing the wheel speed signal V from the wheel speed signal generator 3 of the skid control system will be described.

The output terminal of the wheel speed signal generator 3 is connected to an input terminal of an A/D convertor 14. The analogue value of the output of the wheel speed signal generator 3 is converted to a digital value of n-bits by the A/D convertor 14, and it is supplied to input terminals $D_0, D_1 \ldots D_n$ of a latch circuit 15.

According to this embodiment, the output V of the wheel speed signal generator 3 is analogue. If it is digital, it is supplied directly to the input terminals $D_0, D_1, \ldots D_n$ of the latch circuit 15.

Output terminals $Q_0, Q_1 \ldots Q_n$ of the latch circuit 15 are connected to input terminals $D_0, D_1, \ldots D_n$ of a parallel input/serial output shift register 16, respectively. An output terminal Q of the shift register 16 is connected to an input terminal of a memory device 17 which is constituted by a serial input/output shift register.

The latch circuit 15 temporarily memorizes the digital signal from the A/D converter 14. The digital signal applied to the input terminals $D_0, D_1, \ldots D_n$ of the latch circuit 15 is set in the latch circuit 15 whenever a pulse is supplied to a latch terminal L of the latch circuit 15, and it is taken out from the output terminals $Q_0, Q_1 \ldots Q_n$ of the latch circuit 15. The parallel input/serial output register 16 is put into the set condition with a high level signal "1" supplied to a negation reset input terminal R of the shift register 16. The digital value of n-bits supplied to the input terminals $D_0, D_1, \ldots D_n$ of the shift register 16 is taken out bit by bit from the output terminal Q of the shift register 16 whenever a shift pulse is supplied to a shift terminal SH of the shift register 16. The digital output of n-bits from the latch circuit 15 is loaded into the shift register 16 with a pulse supplied to a preset terminal PS of the shift register 16.

The serial input/serial output shift register 17 constituting the memory device consists of series-connected flip flops $F_1, F_2, \ldots F_m$. The signals supplied from the output terminal Q of the shift register 16 are shifted one by one rightwards in sequence in the shift register 17 whenever a clock pulse is supplied to terminals C of the flip flops $F_1, F_2, \ldots F_m$. The number "m" of the flip flops $F_1, F_2, \ldots F_m$ is so designed as to be larger than the number of the output signals taken out from the output terminal Q of the shift register 16 for one braking operation. Normally, it is so large that the memory device 17 can memorize the wheel speed signals for several braking operations.

An output terminal of the memory device 17 is connected to an input terminal D of a serial input/parallel output shift register 18. Output terminals $Q_0, Q_1 \ldots Q_n$ of the shift register 18 are connected to input terminals $D_0, D_1 \ldots D_n$ of a latch circuit 19, respectively. Further, output terminals $Q_0, Q_1, \ldots Q_n$ of the latch circuit 19 are connected to input terminals of a D/A convertor 20, respectively. A read-out device for reading out the content of the memory 17 is constituted by the serial-input/parallel-output shift register 18 and the latch circuit 19. The serial-input/parallel-output shift register 18 works in contrast with the parallel-input/serial-output shift register 16. The signals supplied to the input terminal D of the shift register 18 from the output terminal of the memory device 17 are shifted in sequence in the shift register 18 in synchronization with shift pulses supplied to a shift terminal SH of the shift register 18. Thus, a digital value of n-bits is formed by the n signals, and it is transmitted from the output terminals $Q_0, Q_1, \ldots Q_n$ of the shift register 18 to the input terminals $D_0, D_1, \ldots D_n$ of the latch circuit 19 which works in the same manner as the latch circuit 15. Whenever a latch pulse is supplied to a latch terminal L of the latch circuit 19, the digital value supplied to the input terminals $D_0, D_1, \ldots D_n$ of the latch circuit 19 is temporarily memorized in the latch circuit 19. The digital value from the latch circuit 19 is converted into an analogue value by the D/A convertor 20 in order to record into an external recorder the wheel speed signals memorized in the memory device 17.

A brake operation signal generator 21 is constituted, for example, by a stop lamp switch which is actuated by treading a brake pedal. When the brake pedal is trodden for braking the vehicle, a brake operation signal of "1" is supplied to one input terminal of an OR gate 22. Another input terminal of the OR gate 22 is connected through an OFF delay timer 23 to an output terminal of an OR gate 24. Input terminals of the OR gate 24 are connected to the transmission lines 12 and 13 for the control signals of the skid control unit 2. The output of the OFF delay timer 23 becomes "1" with the output signal "1" of the OR gate 24. After the output of the OR gate 24 becomes "0", it is maintained at the high level "1" for a delay time. The control signals are intermittently generated from the skid control unit 2. The OFF delay timer 23 receives the intermittent control signals from the OR gate 24. However, the delay time of the OFF delay timer 23 is so long that the output signal of the OFF delay timer 23 is continuous during the skid control operation.

An output terminal of the OR gate 22 is connected to the negation reset terminal R of the parallel-input/serial-output shift register 16. A switch device 28 for controlling the transmission of the wheel speed signal V of the wheel speed signal generator 3 to the memory device 17 is constituted by the OR gate 22 and the reset portion of the shift register 16.

Further, the output terminal of the OR gate 22 is connected to one input terminal of an AND gate 25, an input terminal D of a flip flop 26, and through a change-over switch $S_1$ to one input terminal of an AND gate 27. Another input terminal of the AND gate 25 is connected to an output terminal $\bar{Q}$ of the flip flop 26. A terminal C of the flip flop 26 is connected to a clock pulse generator 29. Another input terminal of the AND gate 27 is also connected to the clock pulse generater 29.

An output terminal of the AND gate 27 is connected to a terminal C of a counter 30, through a change-over switch $S_2$ to the shift terminal SH of the shift register 16, and the terminals C of the flip flops $F_1, F_2, \ldots F_m$ of the memory device 17. The counter 30 is of mod n type. The number n corresponds to the bit numbers of the latch circuits 15 and 19, and shift registers 16 and 18, respectively. An output terminal CO of the counter 30 is connected through a change-over switch $S_3$ to the latch terminal L of the latch circuit 15 and the preset terminal PS of the shift register 16. A reset terminal RES of the counter 30 is connected to an output terminal of the AND gate 25.

The change-over switches $S_1$, $S_2$ and $S_3$ are ganged with each other, as shown by the dash lines. When the switches $S_1$, $S_2$ and $S_3$ are changed over to other contacts from the shown positions, the one input terminal of the AND gate 27 is connected through a resistor 31 to a positive power source 32, the output terminal of the AND gate 27 is connected to the terminal SH of the shift register 18, and the output terminal CO of the counter 30 is connected to the latch terminal L of the latch circuit 19. Next, there will be described operations of the memory system of wheel speed of the vehicle with skid control system of FIG. 1 with reference to FIG. 2 and FIG. 3.

Figure 2:
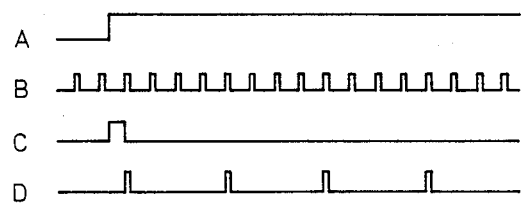
FIG. 2 is waveforms of signals at the respective parts of FIG. 1.

Normally, the change-over switches $S_1$, $S_2$ and $S_3$ are so positioned as shown in FIG. 1. When the vehicle runs at constant speed, the wheel speed signal V proportional to the vehicle speed or wheel rotational speed is generated from the wheel speed signal generator 3. It is supplied to the differentiator 4, slip signal generator 8, and A/D convertor 14. However, since the vehicle runs at constant speed, none of the acceleration signal $+b$, deceleration signal $-b$ and slip signal S are generated. Accordingly, the control signals do not occur on the lines 12 and 13. Further, since the brake pedal is not trodden, the brake operation signal is not generated from the brake operation signal generator 21. Accordingly, the output signal A of the OR gate 22 is "0", as shown in FIG. 2. The shift register 16 is in the reset condition. The input signal to the one input terminal of the AND gate 27 is "0". Accordingly, the clock pulse B from the clock pulse generator 29, as shown in FIG. 2, is inhibited by the AND gate 27. The pulses are not supplied to the latch terminal L of the latch circuit 15, the terminals PS and SH of the shift register 16 and the terminals of the flip flops $F_1, F_2 \ldots F_m$ of the memory device 17. Accordingly, although the digital value of the wheel speed signal V is supplied to the input terminals $D_0, D_1 \ldots D_n$ of the latch circuit 15, it is not transmitted to the memory latch device 17.

When the driver treads the brake pedal to brake the vehicle, the brake operation signal is generated from the brake operation signal generator 21. The output signal A of the OR gate 22 becomes "1", as shown in FIG. 2. Accordingly, the shift register 16 is put into the set condition. The clock pulses B from the clock pulse generator 29 are supplied through the AND gate 27 to the terminal C of the counter 30, the shift terminal SH of the shift register 16 and the terminals C of the memory device 17. When the output signal A of the OR gate 22 is "1", the flip flop 26 is set with the first clock pulse B, and the output signal $\bar{Q}$ thereof becomes "1". The latter becomes "0" with the next clock pulse B. Accordingly, the output C of the AND gate 25 changes as shown in FIG. 2. The counter 30 is put into the set condition with the output C of the AND gate 25. Whenever the counter 30 counts n clock pulses B, an output signal D as shown in FIG. 2 is obtained from the output terminal CO of the counter 30. The output signal D is supplied to the latch terminal L of the latch circuit 15 and the preset terminal PS of the shift register 16. In the example of FIG. 2, n is equal to four.

When the latch pulse D is supplied to the latch terminal L of the latch circuit 15 from the output terminal CO of the n-mod counter 30, the wheel speed signal V converted into the digital value of n-bits by the A/D convertor 14 is latched in the latch circuit 15. The parallel signals representing the digital value of n-bits are converted into n serial signals by the parallel-input/serial-output shift register 16. The n serial signals are one by one transmitted from the shift register 16 into the memory device 17, whenever the clock pulse B is supplied to the shift terminal SH of the shift register 16.

Figure 3:
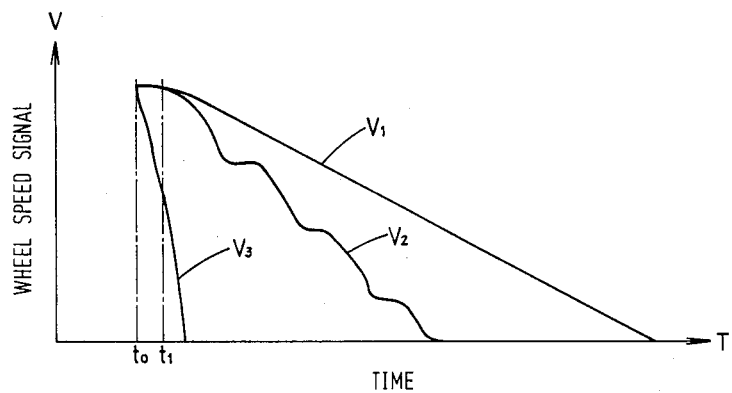
FIG. 3 is a graph showing three typical changes of wheel speed signals memorized in the memory system of FIG. 1.

In FIG. 3, a curve $V_1$ represents the change of the wheel speed signal V in the case that a proper brake fluid pressure is applied to the brake for the wheel by treading the brake pedal. The counter 30 is set at time t0. The wheel speed starts to decrease at time t1. The wheel speed signal V from the wheel speed signal generator 3 decreases along the curve $V_1$. Such change is memorized in the memory device 17. The deceleration of the wheel does not become larger than the predetermined value, and the slip of the wheel does not become larger than the predetermined rate. Accordingly, the control signal is not generated from the skid control unit 2. Thus, the wheel speed signal V decreases in the moderate manner, and the vehicle stops.

A curve $V_2$ represents the change of the wheel speed signal V in the case that the driver rapidly treads the brake pedal. The deceleration of the wheel becomes larger than the predetermined value. The deceleration signal −b is generated from the deceleration signal generator 6. Or the slip of the wheel becomes larger than the predetermined rate. The slip signal S is generated from the slip signal generator 8. The control signals are generated from the skid control unit 2, and they are supplied through the lines 12 and 13 to the solenoid portions 10 and 11 of the cut-off valve and discharge valve to decrease the brake fluid pressure to the brake for the wheel. With the decrease of the brake fluid pressure, the wheel speed starts to increase. When the acceleration of the wheel becomes larger than the predetermined value, the acceleration signal +b is generated from the acceleration signal generator 5. The control signal occurs only on the line 12. The brake fluid pressure is maintained at constant. When the wheel speed becomes nearly equal to the vehicle speed, the acceleration signal +b becomes a logical "0" which, in turn, causes the control signal to become a logical "0". Thus, the brake fluid pressure to the brake for the wheel is again increased. Such operations are repeated. The wheel speed signal V decreases along the curve $V_2$. In that case, the control signals from the skid control unit 2 are supplied through the OR gate 24 and the OFF delay timer 23 to the other input terminal of the OR gate 22. However, since the brake operation signal has been supplied to the one input terminal of the OR gate 22, they have no direct influence on the output of the OR gate 22.

When the vehicle stops and the brake pedal is released from treading, the brake operation signal becomes a logical "0". At that time, the control signal from the skid control unit 2 is already removed, and therefore the output of the OFF delay timer 23 already becomes "0". Accordingly, the output signal A of the OR gate 22 becomes "0", and the parallel-input serial output shift register 16 is put into the reset condition. The transmission of the wheel speed signal to the memory device 17 is stopped. At the same time, the AND gate 27 inhibits to stop the supply of the clock pulse B to the counter 30, shift register 16 and memory 17, and the supply of the output of the counter 30 to the shift register 16.

Next, there will be described memory operation of the wheel speed signal in the case that the vehicle suddenly stops without braking operation, for example, due to vehicle collision.

When the vehicle suddenly stops, the wheel speed rapidly decreases. Almost at the same time when the wheel speed starts to decrease, the deceleration of the wheel becomes larger than the predetermined value or the slip becomes larger than the predetermined rate, and the deceleration signal −b is generated from the deceleration signal generator 6 or the slip signal generator 8. The control signals occur on the lines 12 and 13. The output of the OR gate 24 becomes "1", and it is supplied through the OFF delay timer 23 to the one input terminal of the OR gate 22. The output signal A of the OR gate 22 becomes "1" to put the shift register 16 into the set condition. The clock pulse B is supplied through the AND gate 27 to the shift register 16 and the memory device 17, and the pulse D from the counter 30 is supplied to the latch circuit 15 and shift register 16. Accordingly, the wheel speed signal V from the wheel speed signal generator 3 is supplied through the A/D convertor 14, the latch circuit 15 and the shift register 16 to the memory device 17, and it is memorized in the memory device 17. The memorized wheel speed signal V changes along the curve $V_3$ shown in FIG. 3. In the usual braking operation, the memory device 17 starts to memorize the wheel speed signal V with the brake operation signal. Accordingly, the wheel speed starts to decrease in a little time after the start of the memory operation. On the other hand, when the vehicle is decelerated without braking operation, the memorize device starts to memory the wheel speed signal with the control signal of the skid control unit 2. Accordingly, the deceleration of the wheel speed is considerably high at the start of the memory operation. The wheel speed signal V rapidly decreases at the same time as the start of the memory operation. When the control signal becomes "0" from the skid control unit 2, the output signal A of the OR gate 22 becomes "0" in the delay time of the OFF delay timer 23. Thus, the memorizing device 17 stops to memory the wheel speed signal V.

Next, there will be described operation for reading out the wheel speed signal memorized in the memory device 17.

The output terminal Q of the D/A convertor 20 is connected to the external recorder to record the memorized wheel speed signal therein. Then the change-over switches $S_1$, $S_2$ and $S_3$ are changed over into the other positions from the shown positions. The one input terminal of the AND gate 27 is connected through the change-over switch $S_1$ and the resistor 31 to the positive power source 32. The clock pulse B from the clock pulse generator 29 is supplied to the terminal C of counter 30 and the terminals C of the flip flops $F_1$, $F_2$ . . . $F_m$ of the memory device 17, and through the change-over switch $S_2$ to the shift terminal SH of the serial-input/parallel-output shift register 18. The output pulse D from the output terminal CO of the counter 30 is supplied through the change-over switch $S_3$ to the latch terminal L of the latch circuit 19.

The signals memorized in the flip flops $F_1, F_2 \ldots F_m$ of the memory device 17 are shifted to the next flip flop on the right side every clock pulse B supplied to the terminals C, and they are transmitted one by one to the input terminal D of the serial-input/parallel output shift register 18. One digital value of n-bits is formed from the n output signals of the memory device 17 by the shift register 18, and it is supplied to the input terminals $D_0, D_1, \ldots D_n$ of the latch circuit 19. Whenever the pulse D is supplied to the latch terminal L of the latch circuit 19, the digital value of n-bits is latched in the latch circuit 19, and it is transmitted from the output terminals $Q_0, Q_1, \ldots Q_n$ of the latch circuit 19 to the D/A converter 20. The wheel speed signal memorized in the memory device 17 is converted into the analogue value, and it is recorded into the external recorder.

According to the above-described embodiment, the wheel speed signal is memorized into the memory device 17, when the control signal is generated from the skid control unit 2, or when the brake operation signal is generated from the brake operation signal generator 21. Accordingly, it can be surely known how the vehicle has been braked, and how the wheel speed has changed before the vehicle stops. Further, the change of the wheel speed can be known in the case that the vehicle suddenly stops without braking operation. The time when the braking operation is performed, and the time when the skid control unit operates, are short. Accordingly, the capacity of the memory device can be small. Since the number of necessary informations before the stop of the vehicle may be small, the number of the flip flops of the memory device may be small. The content of the memory device constituted by the shift register is continuously renewed. It can be read out in a short time.

When all of the wheels of the vehicle are associated with skid control systems, respectively, the vehicle leaves no remarkable tire traces on the road with the braking operation. Accordingly it is impossible to prove the braking operation by tire trace. However, according to this, the braking operation can be proved by the memorized wheel speed signal.

While the preferred embodiment has been described, variations thereto will occur to those skilled in the art within the scope of the present inventive concepts which are delineated by the following claims.

For example, in the above embodiment, the wheel speed signal is obtained from the wheel speed signal generator 3 of the skid control unit 2. However, it may be obtained from a separate wheel speed signal generator which is connected to the wheel speed sensor 1.

Further, in the above embodiment, the memory device 17 consists of plural flip flops $F_1, F_2 \ldots F_m$. However, the memory device may consist of magnetic memory elements. Or the analogue wheel speed signal may be recorded on a magnetic tape as a memory device.

What is claimed is:

1. A memory system of wheel speed of a vehicle with skid control system comprising:
   (A) a wheel speed sensor associated with the wheel;
   (B) a skid control unit measuring the skid condition of said wheel on the basis of the output signal of the wheel speed sensor and generating a control signal for controlling the brake fluid pressure to the brake of the wheel;
   (C) a wheel speed signal generator connected to said wheel speed sensor for generating a wheel speed signal having an analogue or digital value proportional to the rotational speed of said wheel;
   (D) a memory device for memorizing said wheel speed signal from said wheel speed signal generator;
   (E) a switch device arranged between said wheel speed signal generator and said memory device for controlling the transmission of said wheel speed signal to said memory device; and
   (F) a brake operation signal generator for generating a brake operation signal when said vehicle is braked, said brake operation signal and said control signal of the skid control unit being supplied to said switch device; and said switch device allowing said wheel speed signal to be transmitted to said memory device when said brake operation signal or said control signal is generated from said brake operation signal generator of said skid control unit.

2. A memory system of wheel speed of a vehicle with skid control system according to claim 1, in which said wheel speed signal is digital, and said memory device comprises plural series-connected flip flops.

3. A memory system of wheel speed of a vehicle with skid control system according to claim 1, in which said memory system further includes an A/D convertor, said wheel speed signal being digitalized by said A/D convertor, and said memory device comprises of plural series-connected flip flops.

4. A memory system of wheel speed of a vehicle with skid control system according to claim 1, in which said memory system further includes a read-out device for reading out the content of said memory device.

5. A memory system of wheel speed of a vehicle with skid control system according to claim 2, in which said memory system further includes a read-out device for reading out the content of said memory device, said read-out device comprises a series-input/parallel-output shift register, and the bit number n of said series-input/parallel-output shift register is equal to, or smaller than, the number of said flip flops of the memory device.

6. A memory system of wheel speed of a vehicle with skid control system according to claim 3, in which said memory system further includes a read-out device for reading out the content of said memory device, said read-out device comprises a series-input/parallel-output shift register, and the bit number n of said series-input/parallel-output shift register is equal to, or smaller than, the number of said flip flops of the memory device.

7. A memory system of wheel speed of a vehicle with skid control system according to claim 1, in which said skid control unit includes said wheel speed signal generator.

8. A memory system of wheel speed of a vehicle with skid control system according to claim 1, in which said brake operation signal generator includes a stop lamp switch.

9. A memory system of wheel speed of a vehicle with skid control system according to claim 1, in which said switch device includes an OR gate, said brake operation signal is supplied to one input terminal, and said control signal of the skid control unit is supplied through an OFF delay timer to another input terminal of said OR gate.

10. A memory system of wheel speed of a vehicle with skid control system according to claim 2, in which said switch device includes an OR gate, said brake operation signal is supplied to one input terminal, and said control signal of the skid control unit is supplied through an OFF delay timer to another input terminal of said OR gate.

11. A memory system of wheel speed of a vehicle with skid control system according to claim 3, in which said switch device includes an OR gate, said brake operation signal is supplied to one input terminal, and said control signal of the skid control unit is supplied through an OFF delay timer to another input terminal of said OR gate.

12. A memory system of wheel speed of a vehicle with skid control system according to claim 10, in which said memory system further includes a n-bit latch circuit for latching said digital wheel speed signal, and a parallel-input (n-bit)/series output shift register being connected to said n-bit latch circuit at the input terminals and to said memory device at the output terminal, and the output terminal of said OR gate is connected to a negation reset terminal of said parallel-input/series-output register.

13. A memory system of wheel speed of a vehicle with skid control system according to claim 11, in which said memory system further includes a n-bit latch circuit for latching said digital wheel speed signal, and a parallel-input (n-bit)/series output shift register being connected to said latch circuit at the input terminals and to said memory device at the output terminal, and the output terminal of said OR gate is connected to a negation reset terminal of said parallel-input/series-output register.

14. A memory system of wheel speed of a vehicle with skid control system according to claim 12, in which said memory system further includes a read-out device for reading out the content of said memory device, said read-out device comprises a series-input/parallel-output shift register, and the bit number n of said series-input/parallel-output shift register is equal to, or smaller than, the number of said flip flops of the memory device.

15. A memory system of wheel speed of a vehicle with skid control system according to claim 13, in which said memory system further includes a read-out device for reading out the content of said memory device, said read-out device comprises a series-input/parallel-output shift register, and the bit number n of said series-input/parallel-output shift register is equal to, or smaller than, the number of said flip flops of the memory device.

16. A memory system of wheel speed of a vehicle with skid control system according to claim 14, in which said memory system further includes a clock pulse generator and switching means, the clock pulse from said clock pulse generator is supplied to said flip flops of the memory device, and supplied through said switch means selectively to said parallel input/series-output shift register or said series-input/parallel-output shift register.

17. A memory system of wheel speed of a vehicle with skid control system according to claim 15, in which said memory system further includes a clock pulse generator and switching means, the clock pulse from said clock pulse generator is supplied to said flip flops of the memory device, and supplied through said switch means selectively to said parallel input/series-output shift register or said series-input/parallel-output shift register.

18. A memory system of wheel speed of a vehicle with skid control system according to claim 16, in which said memory system further includes a n-mod counter counting said clock pulse from the clock pulse generator and second switch means, and said read-out device further includes a second n-bit latch circuit connected to the output terminals of said series-input/parallel-output shift register, the output of said n-mod counter being supplied through said second switch means selectively to said first-mentioned latch circuit and parallel-input/series-output shift register, or said second latch circuit.

19. A memory system of wheel speed of a vehicle with skid control system according to claim 17, in which said memory system further includes a n-mod counter counting said clock pulse from the clock pulse generator and second switch means, and said read-out device further includes a second n-bit latch circuit connected to the output terminals of said series-input/parallel-output shift register, the output of said n-mod counter being supplied through said second switch means selectively to said first-mentioned latch circuit and parallel-input/series-output shift register, or said second latch circuit.

20. A memory system of wheel speed of a vehicle with skid control system comprising:
(A) a wheel speed sensor associated with the wheel;
(B) a skid control unit including a wheel speed signal generator connected to said wheel speed sensor for generating a wheel speed signal having an analogue or digital value proportional to the rotational speed of said wheel, measuring the skid condition of said wheel on the basis of the output signal of the wheel speed signal generator and generating a control signal for controlling the brake fluid pressure to the brake of the wheel;
(C) a memory device for memorizing said wheel speed signal from the wheel speed signal generator of said skid control unit;
(D) a switch device arranged between said wheel speed signal generator and said memory device for controlling the transmission of said wheel speed signal to said memory device; and
(E) a brake operation signal generator for generating a brake operation signal when said vehicle is braked, said brake operation signal and said said control signal is generated from said brake operation signal generator or said skid control unit.

* * * * *